(12) United States Patent
Lembo

(10) Patent No.: US 7,685,783 B2
(45) Date of Patent: *Mar. 30, 2010

(54) KIT OF PARTS FOR BAND JOIST INSULATION AND METHOD OF MANUFACTURE

(75) Inventor: Michael J. Lembo, Souderton, PA (US)

(73) Assignee: CertainTeed Corporation, Valley Forge, PA (US)

( * ) Notice: Subject to any disclaimer, the term of this patent is extended or adjusted under 35 U.S.C. 154(b) by 1096 days.

This patent is subject to a terminal disclaimer.

(21) Appl. No.: 10/851,877

(22) Filed: May 21, 2004

(65) Prior Publication Data

US 2005/0166481 A1 Aug. 4, 2005

Related U.S. Application Data

(60) Provisional application No. 60/540,939, filed on Jan. 30, 2004.

(51) Int. Cl.
*E04B 1/74* (2006.01)

(52) U.S. Cl. .................. 52/407.3; 52/407.1; 52/406.2; 52/404.3; 428/130; 428/121

(58) Field of Classification Search ................ 52/406.1, 52/406.2, 406.3, 407.2, 407.3, 407.1, 404.3, 52/98; 428/130, 121, 167, 74, 75
See application file for complete search history.

(56) References Cited

U.S. PATENT DOCUMENTS 1,238,356 A 8/1917 Stokes 2,913,104 A * 11/1959 Parker .................. 206/321
3,812,002 A 5/1974 Lurie
3,910,145 A 10/1975 Bender et al.

(Continued)

FOREIGN PATENT DOCUMENTS

DE GM 78 30 852 U1 1/1979

(Continued)

OTHER PUBLICATIONS

BChydro, "Band Joist Insulation" Oct. 17, 2003 http://www.bchydro.com/powersmart/elibrary/elibrary642.html?printnow.

(Continued)

*Primary Examiner*—Richard E Chilcot, Jr.
*Assistant Examiner*—Chi Q Nguyen
(74) *Attorney, Agent, or Firm*—Duane Morris LLP

(57) ABSTRACT

A kit of parts having batts (200) of insulation, and one or more batts (200) have partially divided segments (200*a*), wherein each of the segments (200*a*) has an R value and thickness and has length and width dimensions of, at least somewhat greater than 9.5 inches by at least somewhat greater than 14.5 inches to fill band joist cavities between spaced apart joists (106); and the batt (200) is either three segments (200*a*) in length or four segments (200*a*) in length, or is folded at intervals of the three segments (200*a*) in length or four segments in length (200*a*), and the batt (200) has a width of either one segment (200*a*) or two segments (200*a*), and the segments (200*a*) of the same batt (200) are partially divided from one another and remain in the batt (200) until separated at the point of use or installation.

16 Claims, 6 Drawing Sheets

U.S. PATENT DOCUMENTS

| | | | |
|---|---|---|---|
| 3,958,385 A | | 5/1976 | Bondra, Jr. et al. |
| 3,964,232 A | | 6/1976 | Bender et al. |
| 3,979,537 A | | 9/1976 | Troyer |
| 4,300,322 A | * | 11/1981 | Clark ................... 52/406.1 |
| 4,342,610 A | | 8/1982 | Ray, Jr. |
| 4,397,898 A | | 8/1983 | Ray, Jr. |
| 4,569,174 A | * | 2/1986 | Bossany ................ 52/406.1 |
| 4,726,985 A | | 2/1988 | Fay et al. |
| 4,756,495 A | | 7/1988 | Gibb |
| 4,764,420 A | | 8/1988 | Gluck et al. |
| 4,835,045 A | | 5/1989 | Kielmeyer et al. |
| 4,866,905 A | | 9/1989 | Bihy et al. |
| 4,972,644 A | | 11/1990 | Rumiesz, Jr. et al. |
| 5,046,392 A | | 9/1991 | Keon et al. |
| 5,246,760 A | | 9/1993 | Krickl |
| 5,331,787 A | | 7/1994 | Paulitschke et al. |
| 5,466,504 A | * | 11/1995 | Gavin et al. ............ 428/74 |
| 5,508,079 A | * | 4/1996 | Grant et al. ............ 428/74 |
| 5,545,279 A | | 8/1996 | Hall et al. |
| 5,545,453 A | * | 8/1996 | Grant .................... 428/43 |
| 5,556,682 A | * | 9/1996 | Gavin et al. ............ 428/74 |
| 5,567,504 A | | 10/1996 | Schakel et al. |
| 5,631,061 A | * | 5/1997 | Wallace et al. ........ 428/130 |
| 5,642,601 A | | 7/1997 | Thompson, Jr. et al. |
| 5,765,318 A | | 6/1998 | Michelsen |
| 5,848,509 A | | 12/1998 | Knapp et al. |
| 6,007,902 A | | 12/1999 | Adur et al. |
| 6,083,594 A | | 7/2000 | Weinstein et al. |
| 6,083,603 A | | 7/2000 | Patel et al. |
| 6,120,873 A | * | 9/2000 | Grant et al. ............ 428/74 |
| 6,141,930 A | | 11/2000 | Allwein et al. |
| 6,148,702 A | | 11/2000 | Bucks |
| 6,165,305 A | | 12/2000 | Weinstein et al. |
| 6,170,369 B1 | | 1/2001 | Weinstein et al. |
| 6,191,057 B1 | | 2/2001 | Patel et al. |
| 6,301,854 B1 | | 10/2001 | Daudet et al. |
| 6,357,504 B1 | | 3/2002 | Patel et al. |
| 6,378,258 B1 | | 4/2002 | Cunningham et al. |
| 6,383,594 B2 | | 5/2002 | Weinstein et al. |
| 6,468,615 B2 | | 10/2002 | Weinstein et al. |
| 6,484,463 B1 | | 11/2002 | Fay |
| 6,551,677 B2 | | 4/2003 | Weinstein et al. |
| 6,740,188 B2 | | 5/2004 | Allwein et al. |
| 6,743,326 B2 | | 6/2004 | Bogrett et al. |
| 6,924,243 B2 | * | 8/2005 | Snyder .................. 442/149 |
| 2001/0030018 A1 | | 10/2001 | Weinstein et al. |
| 2002/0015814 A1 | | 2/2002 | Weinstein et al. |
| 2002/0017590 A1 | | 2/2002 | Fay et al. |
| 2002/0029929 A1 | | 3/2002 | Tinianov |
| 2002/0040556 A1 | | 4/2002 | Weinstein et al. |
| 2002/0114913 A1 | | 8/2002 | Weinstein et al. |
| 2002/0136854 A1 | | 9/2002 | Smith et al. |
| 2002/0162292 A1 | | 11/2002 | Fay |
| 2002/0193231 A1 | | 12/2002 | Bauer |
| 2003/0022580 A1 | | 1/2003 | Bogrett et al. |
| 2003/0032350 A1 | | 2/2003 | Kajander et al. |
| 2003/0032762 A1 | | 2/2003 | Taylor |
| 2003/0148686 A1 | | 8/2003 | Weinstein et al. |
| 2003/0183055 A1 | | 10/2003 | Allwein et al. |
| 2003/0186037 A1 | | 10/2003 | Edge et al. |
| 2003/0221772 A1 | | 12/2003 | Allwein et al. |
| 2003/0224145 A1 | | 12/2003 | Campion et al. |
| 2003/0236043 A1 | | 12/2003 | Calzavara et al. |
| 2004/0003563 A1 | | 1/2004 | Burdic |
| 2004/0025653 A1 | | 2/2004 | Bascom et al. |
| 2004/0074262 A1 | | 4/2004 | Miele et al. |

FOREIGN PATENT DOCUMENTS

| | | |
|---|---|---|
| DE | GM 79 20 480 | 11/1979 |
| DE | 32 29 601 A1 | 2/1984 |
| DE | 4108110 A1 | 12/1991 |
| DE | G 93 02 056.2 | 8/1993 |
| DE | 3118597 A1 | 2/1998 |
| DE | 19700373 A1 | 2/1998 |
| DE | 44 35 317 A1 | 4/1998 |
| EP | 0 732 464 A1 | 9/1996 |
| GB | 1 358345 | 7/1974 |
| WO | WO 98/42930 | 10/1998 |
| WO | WO 01/63063 A1 | 8/2001 |

OTHER PUBLICATIONS

Bernal, "Single-Slot Modules" http://www.bernaltech.com/content.asp?pageID=6.

CertainTeed "Fiber Glass Insulation" Jan. 13, 2003 http://insulation.certainteed.com/cinsulate/cict00001p.html.

CertainTeed, "Standard Batts and Rolls" Jan. 13, 2003 http://insulation.certainteed/com/cinsulate/cict00101p.html.

Commodore Plastics http://www.commodoreplastics.com/content_grinder.html Dec. 20, 2003.

Corfine, "Soft Anvil Web-Fed Rotary Die", Dec. 9, 2003.

GWJ Company, "Trim, Matrix, Waste Removal Systems" http://www.flexopress.com/trimremoval/trimremoval.html Oct. 20, 2003.

David K. Hart Company (Hart Co.), "Soft Anvil Die Cutting System" http://www.die-cut.com/sovt_anvil.html Jun. 16, 2003.

Iowa Energy Center, "The Basement" http://www.energy.iastate.edu/efficiency/residential/homeseries/insulation/basement.html Oct. 17, 2003.

K. O'Neil Machinery Sales, "Cutter" http://www.one1machinery.com/detail.asp?id=5214.

Precision AirConvey (PAC), 78-GP Series Granulator—Internal View http://www.precisioncutters.com/products/granulator/model78g/inside78g/inside78g.html.

Gullfiber, Insulation with Gullfiber, Do-it-yourself, Dec. 1983, trade literature.

Superfos Glass Wool, Glasuld Perfofilt, Jan. 1975, trade literature.

Gullfiber M-Skiva, Mar. 1984 trade literature.

Johns Manville EasyFit™ trade literature.

Johns Manville Formaldehyde-free trade literature.

* cited by examiner

KIT OF PARTS FOR BAND JOIST INSULATION AND METHOD OF MANUFACTURE

CROSS REFERENCE TO RELATED APPLICATION

This application claims the benefit of U.S. Provisional Application No. 60/540,939, filed Jan. 30, 2004.

FIELD OF THE INVENTION

The invention relates to insulation products for insulating between framing members of a building.

BACKGROUND

With reference to FIG. 1, a basement or crawl space of a building has an exterior foundation wall (100) for the most part below grade level of the earth. The top of the wall (100) is covered with a sill or sill plate (102) of wood or other plate material. Sometimes the sill plate is omitted. A frame for supporting a floor is constructed, as follows. Framing members of the building known as joist plates or headers (104) are sawn lumber or boards, which are laid edgewise to span along, either the top of the sill plate (102), or the top of the basement wall (100) in the absence of a sill plate (102). Horizontal framing members of the building comprise joists (106) that span from one joist plate (104) to another. The joists (106) can be dimensional lumber, such as, 2×10 wood, or composite wood joists, such as 9.5 inch I-joists, or open web joists, such as, 9.5" open web joists, or steel I-beams of various depths and flanges, or other materials and similar shapes that function to support the floor (108) and a floor load. Further, the joists (106) and/or the headers (104) can be fabricated from, one or more, elemental metals, alloys, polymer materials, material composites, and laminates, and combinations thereof.

Ends of the joists (106) are nailed or otherwise secured to the headers (104), and the headers (104) are toe nailed or otherwise secured to the sill plate (102) In high wind regions, metal anchor plates, not shown, secure the joists (106) and the headers (104) to the sill plate (102). The joists (106) include an exterior joist (106a) in reference to an endmost joist (106a) that is located at the exterior of the building. An exterior joist (106a) includes, and is not limited to, one that is parallel to the joists (106) of the floor framing. Each floor (108) of a building can be supported on a similar construction of joists (106) and headers (104).

Exterior joists (106a) and exterior joist plates or headers (104) extend along an exterior of the building. Collectively, they are referred to as band joists. The band joists are required to be filled by insulation installed on site. The insulation is installed in a band joist cavity defined with a width between two joists (106) on centers, and further defined with a length between a floor (108) or subfloor supported by the joists (106), and the plate (102) supporting the joists (106). The plate (106) can be supported by a basement wall (100), the thickness of which basement wall (100) defines the depth of the band joist cavity.

The joists (106), for example, are sawn lumber or boards of standard 2× (two-by) thickness. The actual thickness is 1.5 inches. The joists (106) are spaced apart on standard centers, or centerlines, of 12 inches, 16 inches, 19.2 inches or 24 inches. Thus the width of the band joist cavity between joists on 12 inch centers is 10.5 inches wide. The width of the band joist cavity between joists on 16 inch centers is 14.5 inches wide. The width of the band joist cavity between joists on 19.2 inch centers is 17.7 inches wide. The width of the band joist cavity between joists on 24 inch centers is 22.5 inches wide.

The joists (106) are 2×12's, measuring 1.5 inches thick by 11.5 inches wide. Thus, 2×12 joists (106) define band joist cavities 11.5 inches in length. Alternatively, the joists (106) are 2×10's, measuring 1.5 inches thick by 9.5 inches wide. Thus, 2×10 joists (106) define band joist cavities 9.5 inches in length. The joists (106) and the headers (104) are the same board size. Alternatively, the length of a band joist cavity is 13.5 inches defined by the width of 2×14 joists (106). Alternatively, the length of a band joist cavity is 15.5 inches defined by the width of 2×16 joists (106).

Fibrous insulation is available as a commercial product in widths of 11, 15, 15.25, 16, 23, 23.25, 24 or 25 inches, although, 25 inches is not a common insulation width. The insulation is supplied as a continuous roll or as a batt having a length, including 46, 47, 93, 94, 96 or 105 inches. Insulation of 11 inches wide is capable of insulating the band joist cavity of 10.5 inches wide between two joists (106) on 12 inch centers. The insulation of 11 inches wide adapts by compression, i.e., compression to a smaller volume, to fit in the space 10.5 inches wide. However, prior to the invention, the insulation was measured and cut to length at the installation site.

Similarly, insulation of 15, 15.25 or 16 inches wide adapts by compression to fill the band joist cavity of 14.5 inches wide between 2× (two-by) joists (106) on 16 inch centers. However, prior to the invention, the insulation was measured and cut to length at the installation site. Insulation of 23, 23.25, 24 or 25 inches wide adapts by compression to fill the band joist cavity of either 17.7 inches wide or 22.5 inches wide between joists (106) on 19.2 inch centers or 24 inch centers. However, prior to the invention, the insulation was measured and cut to length at the installation site.

Prior to the invention, the batt or continuous roll was measured and cut for each band joist cavity. Usually, an oversize piece was measured and cut. An oversize piece was assured to become compressed in both width and length in the cavity to be retained in place. Further, an oversize piece was cut to avoid having an undersized piece that would be too small, and therefore discarded as scrap. However, if the oversize piece was too generous in size, when the oversize piece could have been smaller, then some amount of insulation was wasted. Further, after cutting and removing too generous an oversize piece from a batt or roll, the remainder of the batt or roll would become too short for further use, and therefore would be discarded as scrap. Thus, there is a need for an invention that reduces the time expended for measuring and cutting insulation into pieces. Further, there is a need for an invention that avoids cutting a piece that is either too small or too generous in size.

Further, scrap is produced when a batt or roll of insulation is split lengthwise so as to have a narrow and long piece to cover an area that is narrow and long. For example, a narrow and long piece of insulation would be needed to cover along the length of a band joist (106a), FIG. 1B, at an exterior of a building. Thus, there is a need for an invention that would reduce scrap and lost time resulting from having to measure and split a batt or roll to have a narrow and long piece at an installation site for insulating along a length of a band joist (106a).

SUMMARY OF THE INVENTION

According to the invention, insulation capable of compression is precut into batts, and the batts are partially divided into segments, for filling band joist cavities with a whole number of the segments between spaced apart joists. An advantage of the invention resides in an insulation product having insulation segments with a set of fixed dimensions to insulate band joist cavities of different widths and lengths, as defined by joists of different widths and spaced apart on different centers. Another advantage of the invention is that the segments are precut to reduce scrap that would result from cutting the batt into segments that are either too small or too generous in size. A further advantage of the invention is that installation time is saved by reducing the time for measuring and cutting the insulation to desired sizes.

By installing the segments in different orientations, the segments adapt by compression to fill band joist cavities of different widths and lengths. Measuring and cutting the insulation is no longer necessary, and after removing one or more of the segments, the remainder of the batt has one or more segments, which have useful widths and lengths, thereby avoiding a potential source of scrap.

According to another embodiment of the invention, the segments are partially divided from one another, and advantageously remain connected in a batt or in a more lengthy folded batt until they are separated at the point of use or installation.

According to another embodiment of the invention, a batt of insulation capable of compression is precut into segments of said insulation having a desired R-value and thickness, and further having a set of fixed dimensions, such that a whole number of said segments fills a band joist cavity.

According to an embodiment of the invention, the segments of insulation have widths and lengths, such that a whole segment adapts to cover the width of a band joist cavity between two joists, and a whole number of segments are oriented and installed beside another to fill a band joist cavity between two joists on relatively wide centers. The segments are installed in the same orientation or in different orientations to adapt to band joist cavities of different widths and lengths.

Another embodiment of the invention pertains to a method of making presently manufactured insulation having different widths, into segments of insulation having a set of fixed dimensions that fill band joist cavities of different widths and lengths with a whole number of segments.

According to a further embodiment of the invention, a kit of parts has multiple batts of insulation precut into segments, each having a desired R-value and thickness, and further having a set of fixed dimensions for insulating band joist cavities of different widths and lengths.

According to a further embodiment of the invention, a kit of parts has one or more batts of insulation precut into segments, and a length of narrow width insulation to insulate along an exterior joist.

DETAILED DESCRIPTION

Figure 1A:
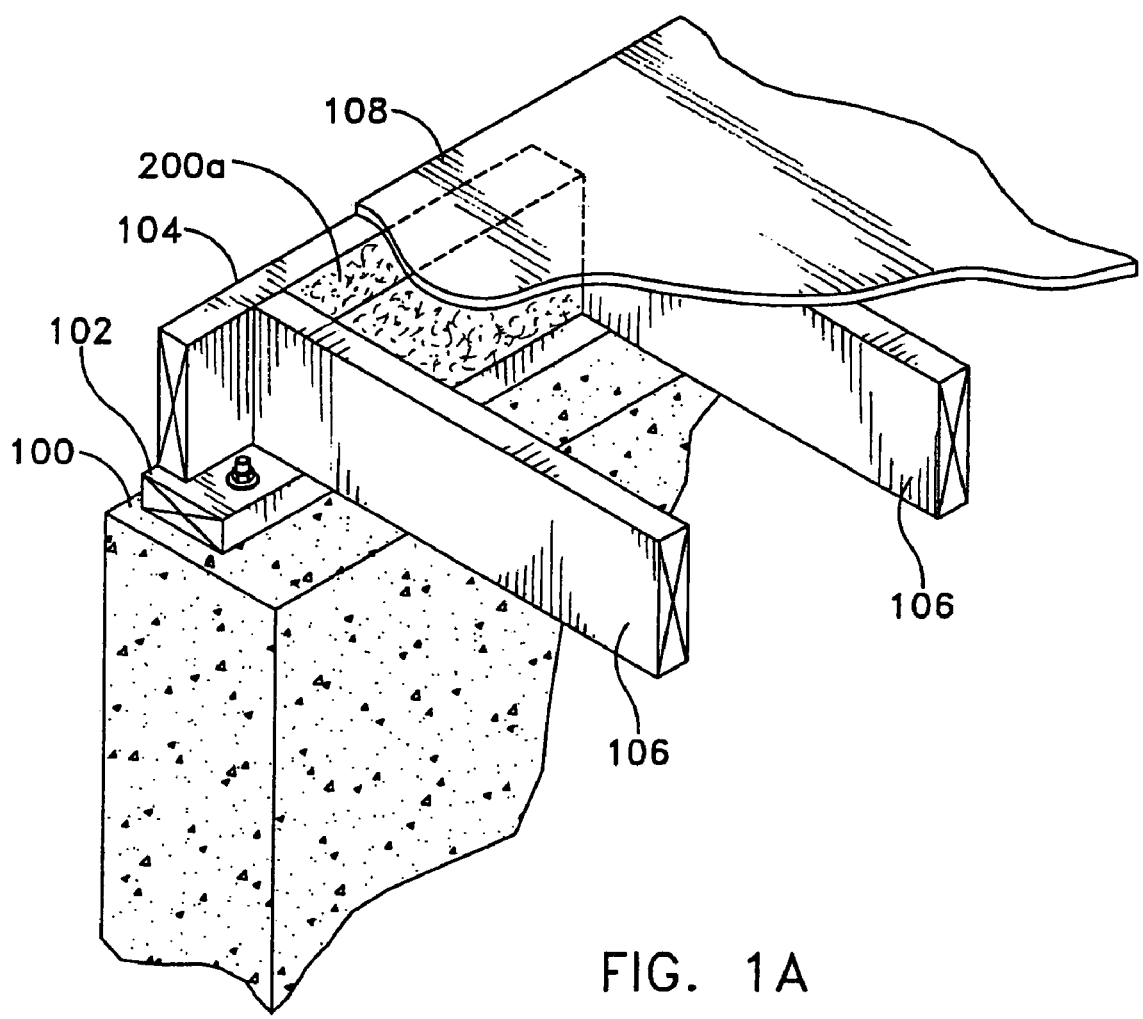
FIG. 1A is an isometric view of a portion of a floor joist construction disclosing an insulation covered band joist cavity.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2A:
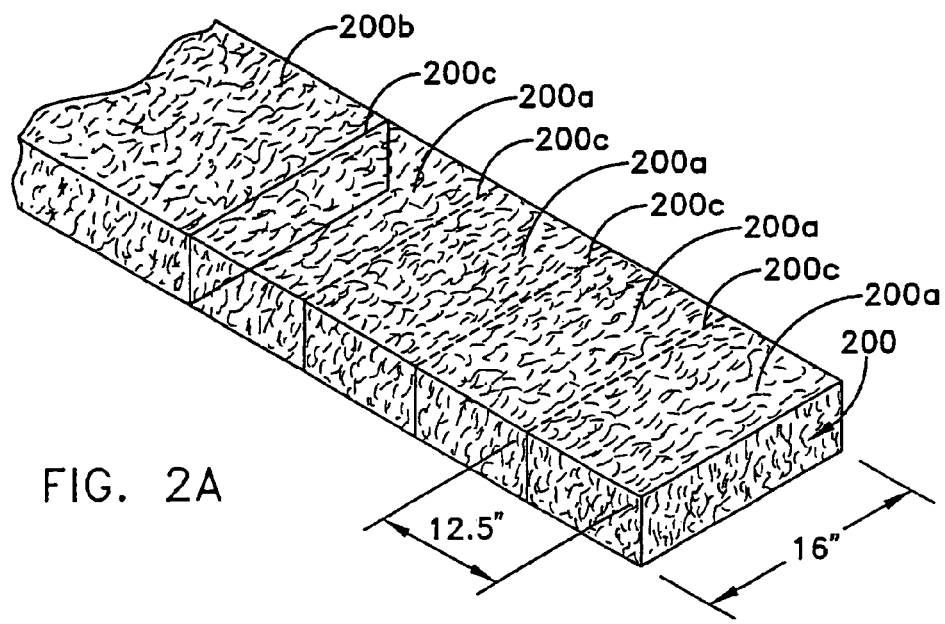
FIG. 2A is an isometric view of a batt of at least four insulation segments long.

With reference to FIG. 2A, an embodiment of the invention pertains to a batt (200) of insulation capable of compression. In FIG. 2A, the batt (200) has a desired batt length of four segments (200a) long and is one segment (200a) wide. Alternatively, a lengthy batt (200) is made longer than four segments (200a) long, and then is folded, i.e. doubled back on itself, at each interval of a desired batt length, or at each interval of four segments (200a) long.

Figure 2B:
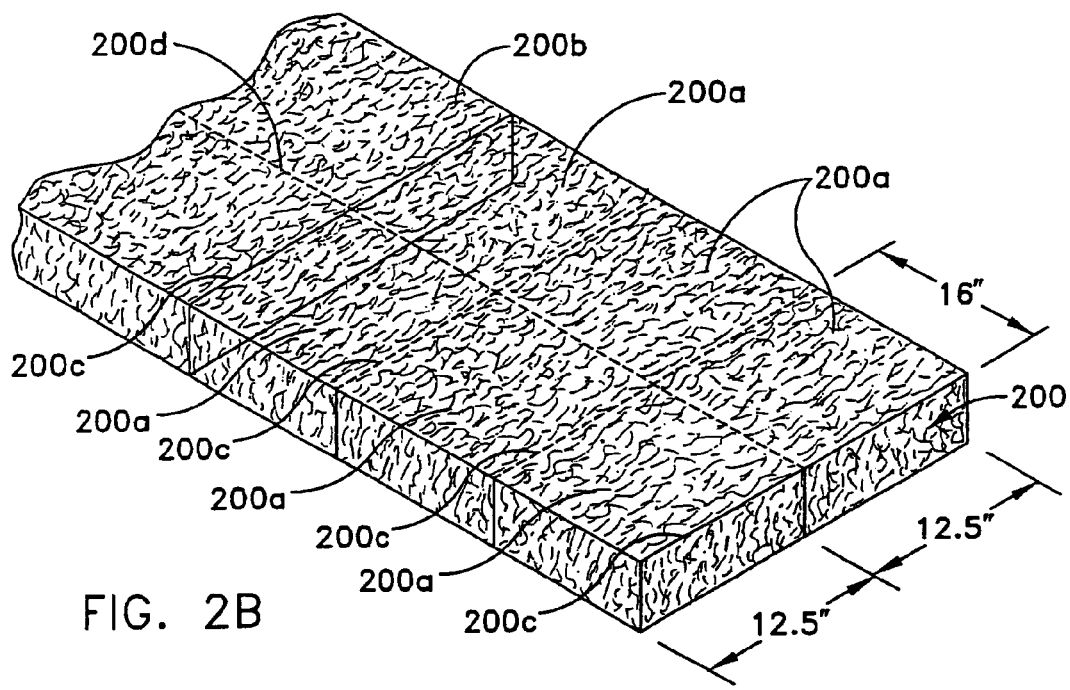
FIG. 2B is an isometric view of one batt one segment wide, or two batts one segment wide, made from a continuous length of insulation, and each of the batts being at least three segments in length.

FIG. 2A discloses four segments (200a) each oriented with their longer dimension across the width of the batt (200), and their shorter dimension extending lengthwise of the batt (200). FIG. 2B discloses two sets of three segments (200a), each being oriented ninety degrees with respect to the four segments (200a) in the batt (200) of FIG. 2A. Thus with reference to FIG. 2B, another embodiment of the batt (200) has a desired batt length of three segments (200a) long, and is one segment (200a) wide. Alternatively, a lengthy batt (200) is made longer than three segments long, and then is folded, i.e. doubled back on itself, at each interval of a desired batt length, or at each interval of three segments (200a) long.

Alternatively, FIG. 2B discloses a continuous length (200b) of insulation partially divided lengthwise by a penetrating cut (200d) to provide a batt (200) of two segments (200a) wide. The batt (200) of two segments wide is partially divided by penetrating cuts (200c) into three segments (200a) long. For example, the batt width is two segments (200a) wide, with two segments (220a) having the same width or different widths. Alternatively, completely dividing the continuous length (200b) of insulation by a continuous lengthwise cut (200d), provides two individual batts (200) of one segment (200a) wide. Alternatively, a continuous length (200b) of insulation can be divided lengthwise, either partially or completely, as described by FIG. 2B, and further made into batts (200) of four segments (200a) long according to a batt (200) as disclosed by FIG. 2A.

Each batt (200) disclosed by either of FIGS. 2A and 2B is partially divided lengthwise into segments (200a). The segments (200a) and the batt (200) are manufactured by severing or cutting a continuous length (200b) of insulation. For example, each of the segments (200a) is manufactured by penetrating a guillotine type chopping blade into the thickness of the continuous length (200b) of insulation. The chopping blade cuts a cut (200c) or groove having a width equal to the width of the chopping blade. Further, the cut (200c) extends only partially through the batt (200), such that the segments (200a) are only partially severed or partially divided from one another, and are only partially severed or partially divided from the batt (200). They are prevented from separation from the batt (200) to avoid being damaged or lost. For example, the cut (200c) can sever the batt (200) leaving an un-severed portion of about 0.05 to 0.5 inches, and more preferably, less than 0.25 inches in thickness or depth. Alternatively, the batt (200) can be skip chopped, meaning chopped by a chopping blade having open grooves in a cutting edge to make a series of interruptions, such that, the chopping blade makes a cut having a series of interruptions along the length of the cut, i.e. a cut in the form of a series of perforations.

When cutting the batt (200) to a desired batt length, a guillotine chopping blade may be used that severs completely across the continuous insulation (200b) to form a batt (200) of any desired number of segments (200a). When a lengthy batt (200) is longer than the four segments (200a), as in FIG. 2A, the lengthy batt (200) is folded at each interval of four segments (200a). When a lengthy batt (200) is longer than the three segments (200a), as in FIG. 2B, the lengthy batt (200) is folded at each interval of three segments (200a).

Figure 2C:
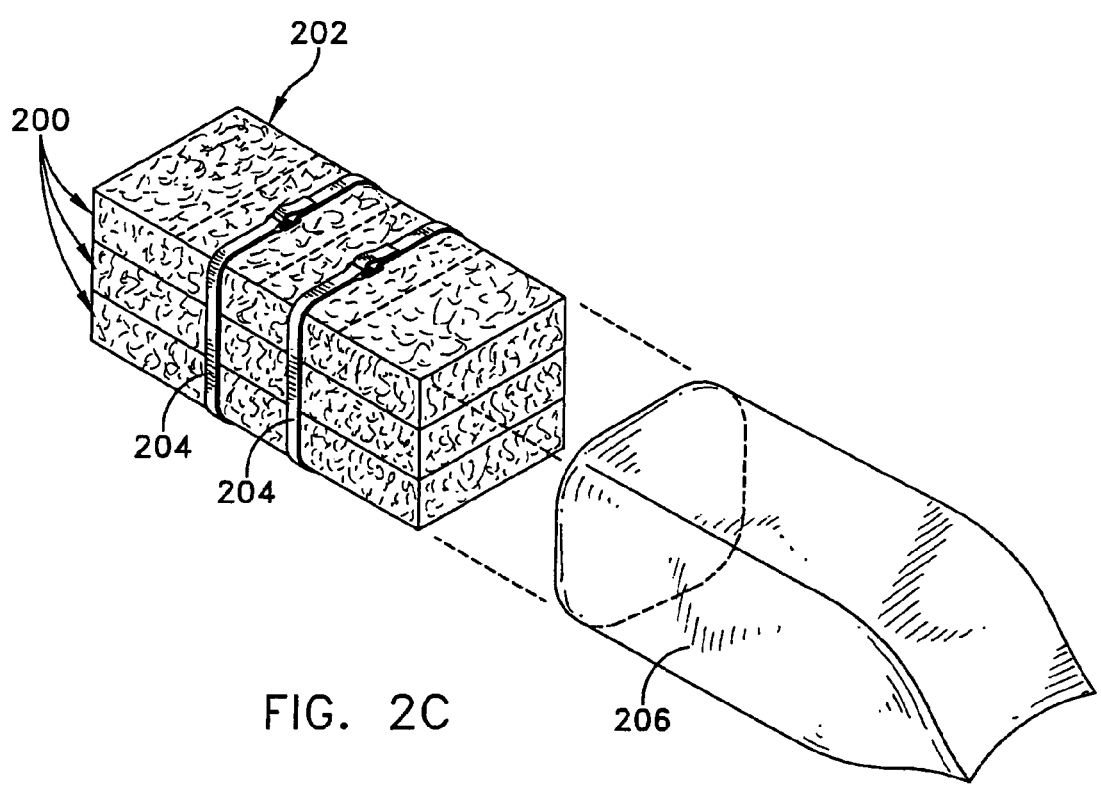
FIG. 2C is an isometric view of a kit of parts.
Figure 2D:
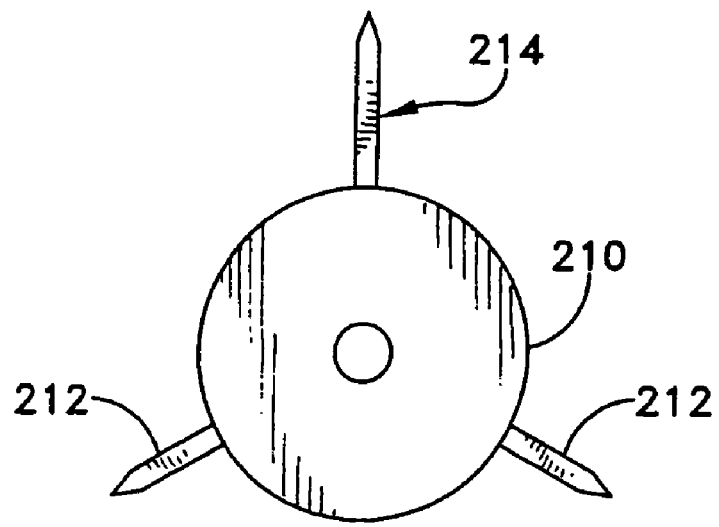
FIG. 2D is a schematic view of a rotary die cutting cylinder.
Figure 2E:
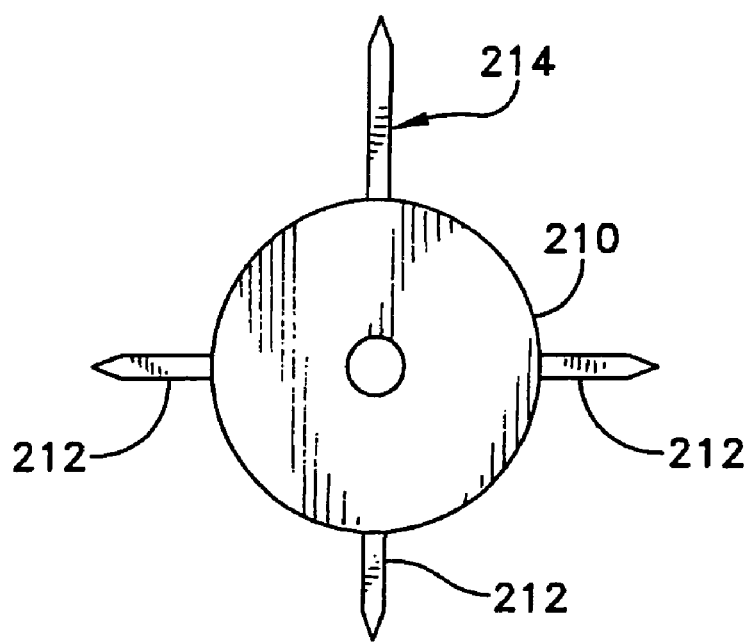
FIG. 2E is a schematic view of another embodiment of a rotary die cutting cylinder.

FIGS. 2D and 2E disclose embodiments of a preferred rotary die cutting cylinder (210) for cutting the continuous insulation (200b) into batts (200) and segments (200a). The rotary die cutting cylinder (210) is part of a rotary die cutting system of the type manufactured by CORfine of Dayton, Ohio. The rotary die cutting cylinder (210) has slicing rules (212) or perfing rules (212) for making corresponding cuts (200c) between the insulation segments (200a). A slicing rule (212) is a rule that cuts a continuous cut (200c) that penetrates only part way through the thickness of the insulation (200b). A perfing rule (212) will make a perforated cut (200c) that has a series of interruptions, such that the insulation (200b) is un-severed at each interruption in the perforated cut (200c). The slicing rules (212) or perfing rules (212) are circumferentially spaced apart on the cylindrical circumference of the die cutting cylinder (210). The slicing rules (212) or perfing rules (212) extend radially outward of the die cutting cylinder (210). As the insulation (200a) is conveyed past the die cutting cylinder (210), the die cutting cylinder (210) rotates to bring each slicing rule (212) or perfing rule (212) into forceful engagement with the insulation (200a), to make a penetrating cut in the insulation (200a) at each interval corresponding to a length of a segment (200a).

In FIG. 2D, the die cutting cylinder (210) has a cutting rule (214) for every two slicing rules (212) or perfing rules (212). The cutting rule (214) severs entirely the insulation (200b) at every interval of three segments (200a) to provide a corresponding batt (200) of three segments (200a) in length, as is the batt (200) disclosed by FIG. 2B. Alternatively, in FIG. 2E, the die cutting cylinder (210) has a cutting rule (214) for every three slicing rules (212), or for every three perfing rules (212). Each cutting rule (214) severs entirely the insulation (200b) at every interval of four segments (200a) to provide a corresponding batt (200) of four segments (200a) in length, as is the batt (200) disclosed by FIG. 2A. Alternatively, an increased number of slicing rules (212) or perfing rules (212) can be added onto an appropriately increased circumference of the die cutting cylinder (210), which would cut a larger number of segments (200a) for each complete rotation of the die cutting cylinder (210). Thus a lengthy batt (200) can be manufactured having more than four segments (200a) in length, as discussed with reference to FIG. 2A, or more than three segments (200a) in length, as discussed with reference to FIG. 2B.

Further, the segments (200a) may be completely severed, and re-adhered along a corresponding cut (200c) and/or (200d) by an adhesive, for example, as disclosed in related and commonly owned U.S. application Ser. No. 10/690,295, entitled SEPARABLE FIBROUS INSULATION, filed Oct. 21, 2003, hereby incorporated by reference. See also U.S. Pat. Nos. 6,083,594; 6,165,305 and 6,670,011, which are hereby incorporated by reference.

Each batt (200) is precut along its length into partially divided segments (200a). Each segment (200a) has a desired R-value and thickness, and further has a major surface area to fill a band joist cavity between spaced apart joists (106). Advantageously, the partially divided segments (200a) remain connected to one another until, at an insulation site, they are separated or removed from the batt (200) as one or a group of a selected whole number of said segments (200a). They are individually removed by manually tearing along a cut (200c) where they are connected to one another. The invention eliminates the need for a tool, such as, a utility knife to cut and remove a segment (200a).

Another advantage of the invention is that the segments (200a) are precut to reduce scrap that would result from cutting the batt (200) into segments (200a) that are either too small or too generous in size. A further advantage of the invention is that installation time is saved by reducing the time for measuring and cutting the insulation to desired sizes. A further advantage of the invention is that the batt (200) is familiar to a worker. Further the batt (200) is convenient for having a length that is relatively easy to handle. One or more batts (200) of convenient batt lengths can be gathered in a kit of parts that is relatively easy to handle.

The insulation that is capable of compression has an expanded volume due to included air, within spaced apart, fibers or particles or foam of such materials as, glass, polymer or cellulose based fibers, particles or foam. An industry standard R-value is a rating number that is printed on the insulation. The R-value refers to the extent to which the insulation reduces the rate of heat transfer through the insulation. The R-value typically increases with increases in thickness and with increases in density of the insulation for a given material. When the insulation is installed, it is capable of compression to fill a band joist cavity having a width between joists (106), for example, on 12 inch centers, 16 inch centers, 17.7 inches or 24 inch centers. Further, the insulation is capable of compression to fill the band joist cavity having a length defined by the width of a joist (106), either 9.5 inches for a 2×10 joist (106), or 11.5 inches for a 2×12 joist (106), or 13.5 inches for a 2×14 joist (106), or 15.5 inches for a 2×16 joist (106). Such a compression is in a direction transverse to the R-value and thickness, which would not substantially reduce the R-value of the insulation.

According to an embodiment of the invention, each segment (200) has a minimum dimension of at least somewhat greater than 9.5 inches wide, to adapt by compression in a band joist cavity having a length of 9.5 inches defined by the width of 2×10 joists (106). For example, each segment (200) is 0.5 inches greater than 9.5 inches wide, which makes each segment about 10.0 inches wide.

With reference to FIG. 2A, the batt (200) is made of four segments (200a) that are different than a segment (200a) of 12.5 inches long as shown in FIG. 2A. A batt (200) of four segments (200a) each of at least somewhat greater than 9.5 inches long, for example, 10 inches long. The batt (200) of four segments (200*a*) in length, would be made into a desired batt length of about 40 inches long, instead of the batt length of 50 inches shown in FIG. 2A. Thus, 40 inches long is a convenient batt length, and a convenient folded batt length, as is the batt length of 50 inches long shown in FIG. 2A. According to an embodiment of the invention, a batt (200) is four segments long with lengths of the segments (200*a*) corresponding to either the widths or the lengths of the band joist cavities.

Similarly, a batt (200), as in FIG. 2B, of three segments (200*a*) having lengths of at least somewhat greater than 9.5 inches long, for example, 10 inches long, instead of a segment (200*a*) of 16 inches long as shown in FIG. 2B, would be made into a desired batt length of about 30 inches long, instead of the batt length of 48 inches long shown in FIG. 2B, and more allowing for dimensional tolerances and the widths of cuts (220*c*), between three segments (200*a*). Thus, 30 inches long is a convenient batt length, and a convenient folded batt length, as is the batt length of 48 inches long shown in FIG. 2B. According to an embodiment of the invention, a batt (200) is three segments long with lengths of the segments (200*a*) corresponding to either the widths or the lengths of the band joist cavities.

According to another embodiment of the invention, each segment (200*a*) has a minimum dimension, in length, in either the batt of FIG. 2A, or the batt of FIG. 2B, of at least somewhat greater than 11.5 inches, for example, 12 inches, to adapt by compression in a band joist cavity of 11.5 inches long as defined by the widths of 2×12 joists (106).

A batt (200), as in FIG. 2A, of four segments (200*a*) having lengths of at least somewhat greater than 11.5 inches long, for example, 12 inches, instead of a segment (200*a*) of 12.5 inches long shown in FIG. 2A, would be made into a desired batt length of about 48 inches long, and more allowing for dimensional tolerances and the widths of cuts (220*c*), between four segments (200*a*). Thus, 48 inches long is a convenient batt length, and a convenient folded batt length.

Similarly, a batt (200), as in FIG. 2B, of three segments (200*a*) having lengths of at least somewhat greater than 11.5 inches long, for example, 12 inches, instead of a segment (200*a*) of 16 inches long shown in FIG. 2B, would be made into a desired batt length of about 36 inches long, and more allowing for dimensional tolerances and the widths of cuts (220*c*), between three segments (200*a*). Thus, 36 inches long is a convenient batt length, and a convenient folded batt length.

According to another embodiment of the invention, each segment (200*a*) has a minimum dimension, in length, in either the batt of FIG. 2A, or the batt of FIG. 2B, of at least somewhat greater than 13.5 inches, for example, 14 inches, to adapt by compression in a band joist cavity of 13.5 inches long as defined by the widths of 2×14 joists (106).

A batt (200), as in FIG. 2A, of four segments (200*a*) having lengths of at least somewhat greater than 13.5 inches long, for example, 14 inches, instead of a segment (200*a*) of 12.5 inches long in FIG. 2A, would be made into a desired batt length of about 56 inches long, and more allowing for dimensional tolerances and the widths of cuts (220*c*), between four segments (200*a*). Thus, 56 inches long is a convenient batt length and a convenient folded batt length.

Similarly, a batt (200), as in FIG. 2B, of three segments (200*a*) having lengths of at least somewhat greater than 13.5 inches long, for example, 14 inches, instead of the 16 inches long shown in FIG. 2B, would be made into a desired batt length of about 42 inches long, and more allowing for dimensional tolerances and the widths of cuts (220*c*), between three segments (200*a*). Thus, 42 inches long is a convenient batt length, and a convenient folded batt length.

According to another embodiment of the invention, each segment (200*a*) has a minimum dimension, in length, in either the batt of FIG. 2A, or the batt of FIG. 2B, of at least somewhat greater than 15.5 inches, for example 16 inches, to adapt by compression in a band joist cavity of 15.5 inches long as defined by the widths of 2×16 joists (106).

A batt (200), as in FIG. 2A, of four segments (200*a*) having lengths of at least somewhat greater than 15.5 inches long, for example, 16 inches, instead of the 12.5 inches long in FIG. 2A, would be made into a desired batt length of about 64 inches long, instead of the batt length of 50 inches long in FIG. 2A, and more allowing for dimensional tolerances and the widths of cuts (220*c*), between four segments (200*a*). Thus, 60 inches long is a convenient batt length and a convenient folded batt length.

Similarly, a batt (200), as in FIG. 2B, of three segments (200*a*) having lengths of at least somewhat greater than 15.5 inches long, for example, 16 inches, would be made into a desired batt length of about 48 inches long, and more allowing for dimensional tolerances and the widths of cuts (220*c*), between three segments (200*a*). Thus, 48 inches long is a convenient batt length, and a convenient folded batt length.

According to another embodiment of the invention, each segment (200*a*) has a minimum dimension of at least somewhat greater than 14.5 inches, for example, 15 inches, instead of the width of 16 inches shown in FIG. 2A, to adapt by compression in a band joist cavity of 14.5 inches wide between joists (106) on 16 inch centers. Such a segment (200*a*) can have a further minimum dimension of at least somewhat greater than 9.5 inches, for example, 10 inches, to fill a band joist cavity of 9.5 inches long. The segment (200*a*) would measure at least somewhat greater than 9.5 inches by at least somewhat greater than 14.5 inches.

To fill a band joist cavity of 11.5 inches long, or 13.5 inches long, for example, the segment (200*a*) is oriented such that its dimension of at least somewhat greater than 14.5 inches extends lengthwise in the band joist cavity of 11.5 inches long or 13.5 inches long. To fill a band joist cavity of 22.5 inches wide between joists (106) on 24 inch centers, for example, two segments (200*a*) are oriented, as follows. One segment (200*a*) of at least somewhat greater than 14.5 inches, and another segment (200*a*) of at least somewhat greater than 9.5 inches, are oriented along the width of the band joist cavity, and are compressed in the length of the band joist cavity. Thus, according to the invention, a whole number of one or more of the segments (200*a*) adapt by compression to fill band joist cavities of different sizes.

A batt (200) of four segments (200*a*) each at least somewhat greater than 14.5 inches long, for example, 15 inches, would have a convenient batt length of about 60 inches long and more allowing for dimensional tolerances and for the widths of cuts (200*c*) between the segments (200*a*). A batt (200) of three segments (200*a*) each would have a smaller, convenient batt length of about 45 inches long and more allowing for dimensional tolerances and for the widths of cuts (200*c*) between the segments (200*a*).

According to another embodiment of the invention, each segment (200*a*) has a minimum dimension, in width, in the batt of FIG. 2A, of at least somewhat greater than 10.5 inches, for example, 11 inches, to adapt by compression in a band joist cavity of 10.5 inches wide between joists (106) on 12 inch centers. Such a segment (200*a*) can have a further minimum dimension, in length, in the batt of FIG. 2A, of at least somewhat greater than 14.5 inches, for example, 15 inches, to fill a band joist cavity of 14.5 inches wide. The segment (200a) would measure at least somewhat greater than 10.5 inches by at least somewhat greater than 14.5 inches.

To fill a band joist cavity of 11.5 inches long, for example, the segment (200a) is oriented such that its dimension of at least somewhat greater than 14.5 inches extends lengthwise in the band joist cavity of 11.5 inches long. To fill a band joist cavity of 17.7 inches wide between joists (106) on 19.2 inch centers, for example, two segments (200a) are oriented the same, such that their respective dimensions of at least somewhat greater than 10.5 inches, are oriented along the width of the band joist cavity, and are further compressed in the length of the band joist cavity. To fill a band joist cavity of 22.5 inches wide between joists (106) on 24 inch centers, for example, two segments (200a) are oriented differently, such that one segment (200a) of at least somewhat greater than 14.5 inches, and another segment (200a) of at least somewhat greater than 10.5 inches, are oriented along the width of the band joist cavity, and are further compressed in the length of the band joist cavity. Thus, according to the invention, a whole number of one or more of the segments (200a) adapt by compression to fill band joist cavities of different sizes.

According to an embodiment of the invention, one or more segments (200a) adapt by compression in a width of 17.7 inches between joists (106) on 19.2 inch centers, or, alternatively, in a width of 22.5 inches between joists (106) on 24 inch centers. A minimum of two segments (200a) are oriented beside one another, either in the same orientation, or in different orientations, and when their dimensions are added together, their sum is at least somewhat greater than 17.7 inches and 22.5 inches, respectively.

A batt (200) according to an embodiment of the invention has segments (220a), each of which is 12.5 inches by 16 inches. Thus, according to FIG. 2A, a batt (200) of four segments (200a) long is made from a continuous insulation (200b) of 16 inches wide, with each segment (200a) having a nominal dimension of 12.5 inches in length. Then, the batt (200) will have a desirable batt length of about 50 inches, allowing extra length for dimensional tolerances and for the widths of the numerous cuts (200c) between four segments (200a). Alternatively, a lengthy batt (200) of more than four segments (200a) in length is made, and then folded at each interval of desired batt length, or each interval of four segments (200a), which results in a batt length that is relatively easy to handle.

Alternatively, according to FIG. 2B, the batt (200) of three segments (200a) long is made from a continuous insulation (200b) of 12.5 inches wide, with each segment (200a) being 16 inches in length and 12.5 inches wide.

Alternatively, a 25 inch wide continuous insulation (200b) is partially divided lengthwise, as in FIG. 2B, to provide a batt (200) of two segments wide, with each segment being 12.5 inches wide. Further, the 25 inch wide continuous insulation (200b) is divided completely lengthwise to provide two batts (200) each, of one segment wide. Each batt (200) of three segments (200a) having lengths of 16 inches, will have a desirable batt length of about 48 inches, allowing extra length for dimensional tolerances and for the widths of the numerous cuts (200c) between three segments (200a). Alternatively, according to FIG. 2B, a lengthy batt (200) of more than three segments (200a) in length is made, and then folded at each interval of desired batt length, or each interval of three segments (200a), which results in a batt length that is relatively easy to handle.

According to an embodiment of the invention, for example, a 12.5 inch by 16 inch segment (200a) is removed from a batt (200) and is oriented with its 12.5 inch dimension to adapt by compression in a band joist cavity of 10.5 inches wide, as between joists (106) on 12 inch centers. The 16 inch dimension of the segment (200a) is further compressed in a band joist cavity having, either a length of 9.5 inches defined by the width of 2×10 joists (106), or a length of 11.5 inches defined by the width of 2×12 inch joists (106).

Alternatively, for example, the segment (200a) is oriented with its 16 inch dimension to adapt by compression in a band joist cavity of 14.5 inches wide, as between joists (106) on 16 inch centers, and further, the 12.5 inch dimension is compressed in a band joist cavity having, either a length of 9.5 inches defined by 2×10 inch wide joists (106), or a length of 11.5 inches defined by 2×12 inch wide joists (106).

Alternatively, for example, two segments (200a) are removed from a batt (200), and are oriented with their 12.5 inches spanning horizontally to adapt by compression in a band joist cavity of 17.7 inches wide, as between joists (106) on 19.2 inch centers, or, alternatively, a band joist cavity of 22.5 inches wide, as between joists (106) on 24 inch centers. Further, the 16 inches dimension of two segments (200a) compress to fill a band joist cavity of 13.5 inches, as defined by the width of 2×14 joists (106), or to fill a band joist cavity of 15.5 inches, as defined by the width of 2×16 joists (106).

The 16 inch dimensions of the segments (200a) are compressed to fill a band joist cavity having, either a length of 9.5 inches defined by the width of 2×10 inch wide joists (106), or a length of 11.5 inches defined by the width of 2×12 inch wide joists (106), or a length of 13.5 inches defined by the width of 2×14 wide joists (106), or a length of 15.5 inches defined by the width of 2×16 wide joists (106). Thus, segments (200a) of 12.5 inches by 16 inches adapt for compression in band joist cavities of various dimensions defined by joists (106) of different widths, and spaced apart on 12, 16, 19.2 or 24 inch centers. The segments (200a) of at least 16 inches in width or length have the further advantage of filling between joists on 12, 16, 19.2 or 24 inch centers, when the joists are less than 1.5 inches thick, wherein the joists are I-joists having web thicknesses of either 0.5 inches or 0.25 inches, or wherein the joists are open web joists which have tapered thicknesses. This is accomplished by either by keeping two segments together, or by using two separate segments side by side, and orienting the two segments as required to best fill a corresponding band joist cavity.

According to the invention, a continuous length (200b) of 16 inches wide insulation (200b) can be made into segments (200a) of at least somewhat greater than 9.5, at least somewhat greater than 10.5 inches, or at least somewhat greater than 11.5 inches long, including and not limited to, 12.5 inches long, in a batt (200) according to FIG. 2A. Further, the segments (200a) are made into batts (200) adapted for relative ease in handling. By installing the segments (200a) in different orientations, the segments (200a) adapt by compression to fill band joist cavities of various lengths and widths. The need for measuring and cutting the insulation is reduced, and after removing one or more of the segments (200a), the remainder of the batt (200) has one or more remaining segments (200a), which have useful sizes, thereby avoiding a potential source of scrap.

Presently Manufactured Insulation

Another embodiment of the invention pertains to a method of making presently manufactured insulation of different widths into segmented batts (200) having segments (200a) of insulation adapted for installation to fill band joist cavities of different sizes. Insulation is presently being manufactured in widths of 11, 15, 15.25, 16, 23, 23.25, 24 or 25 inches. These widths are exemplary only, as different manufacturers may manufacture insulation in different widths. The invention herein, is a method of making presently manufactured widths into segmented batts (200) according to FIGS. 2A and 2B. The advantage is that no new insulation widths need to be manufactured. Further, existing insulation widths make different sizes of segments (200*a*), which adapt to fill band joist cavities despite the segments (200*a*) having different sizes due to being made from different widths of continuous insulation (200*b*).

First, the widths and lengths of band joist cavities is determined. In FIG. 1A, the width of a band joist cavity is 22.5 inches wide between 2× (two by) joists on 24 inch centers. The minimum width of one segment (200*a*) would be at least somewhat greater than 22.5 inches wide to adapt by compression in the band joist cavity of 22.5 inches wide, or, alternatively, a band joist cavity of 17.7 inches wide. Thus, presently manufactured widths of 23, 23.25, 24 and 25 inches are made into segments (200*a*) having these respective widths. A band joist cavity shown in FIG. 1A has a length of 9.5 inches, as defined by 2×10 inch wide joists (106). A segment (200*a*) has a length of at least somewhat greater than 9.5 inches for filling a band joist cavity as defined by 2×10 joists. Similarly, a segment (200*a*) having a length of at least somewhat greater than 11.5 inches is required for filling a band joist cavity 11.5 inches long as defined by 2×12 joists. Similarly, a segment (200*a*) of at least somewhat greater than 13.5 inches in length is required for filling a band joist cavity as defined by 2×14 joists. Similarly, a segment (200*a*) of at least somewhat greater than 15.5 inches in length is required for filling a band joist cavity as defined by 2×16 joists.

The width of a band joist cavity is 14.5 inches wide between 2× (two by) joists on 16 inch centers. The minimum width of a segment (200*a*) would be at least somewhat greater than 14.5 inches wide to adapt by compression in the band joist cavity of 14.5 inches wide, including, and not limited to, presently manufactured widths of 15, 15.25 or 16 inches. Thus, presently manufactured widths of 15, 15.25 or 16 inches are made into segments (200*a*) having these respective widths. The lengths of such segments (200*a*) are at least somewhat greater than 9.5 inches, or at least somewhat greater than 11.5 inches, or at least somewhat greater than 13.5 inches, or at least somewhat greater than 15.5 inches, to fill band joist cavities as defined by respective 2×10, 2×12 2×14 or 2×16 joists (106).

Further, as previously described above, a 16 inch wide continuous insulation (200*b*) is adapted for making segments (200*a*) of 16 inches wide and 12.5 inches long, according to an embodiment of the invention. Such segments (200*a*) of 12.5 inches long adapt by compression in band joist cavities of either 9.5 long or 11.5 inches long. Similarly, segments (200*a*) of 12.5 inches long are manufactured from insulation of 15, 15.25 and 16 inches wide, to be adaptable by compression in a band joist cavity of either 9.5 inches long or 11.5 inches long. Further, two segments (200*a*) are oriented to fill band joist cavities defined by 2×14 or 2×16 joists on 19.2 or 24 inch centers. Alternatively, the segments (200*a*) of 15, 15.25 and 16 inches wide are at least somewhat greater than 9.5 inches long, for example, 10 inches, to adapt by compression in band joist cavities 9.5 inches long. Alternatively the segments (200*a*) of 15, 15.25 and 16 inches wide are at least somewhat greater than 11.5 inches long, for example, 12 inches, to adapt by compression in band joist cavities 11.5 inches long, or in band joist cavities 9.5 inches long. Further, two segments (200*a*) are oriented to fill band joist cavities defined by 2×14 or 2×16 joists on 19.2 or 24 inch centers.

According to another embodiment of the invention, the width of a band joist cavity is determined, as being 10.5 inches wide between 2× (two by) joists on 12 inch centers. The minimum width of a segment (200*a*) would be at least somewhat greater than 10.5 inches wide, for example 11 inches, to adapt by compression in the band joist cavity of 10.5 inches wide.

The presently manufactured width of 11 inches, would adapt by compression in a band joist cavity of 10.5 inches wide between 2× (two by) joists (106). Further, 2×10 joists (106) define a band joist cavity 9.5 inches long. A segment (200*a*) of at least somewhat greater than 9.5 inches long is made to adapt by compression in the band joist cavity. Further, 2×12 joists (106) define a band joist cavity of 11.5 inches long. A segment (200*a*) of at least somewhat greater than 11.5 inches long, for example 12 inches, is made to adapt by compression in a band joist cavity of 11.5 inches long, or 9.5 inches long. Further, the presently manufactured width of 11 inches can be made into segments (200*a*) of somewhat greater than 14.5 inches long, including, and not limited to 15 and 16 inches long, to adapt by compression in a band joist cavity of either 10.5 inches wide or 14.5 inches wide between 2×10 joists (106). Two segments (200*a*) are oriented with their respective dimensions of, 11.5 inches and somewhat greater than 14.5 inches long to adapt by compression in a band joist cavity of 17.7 or 22.5 inches wide between 2×10 joists. Accordingly insulation of 11 inches wide is adaptable to the present invention for 2×10 joists (106).

According to another embodiment of the invention disclosed by FIG. 2B, a continuous length (200*b*) of insulation 25, 24, 23.25 and 23 inches wide are presently being manufactured, and can be adapted to manufacture batts (200) according to FIG. 2B. For example, a 25 inch wide continuous length (200*b*) of insulation is partially divided lengthwise with a cut (200*d*) and then partially divided into three segments (200*a*) long, which provides a batt (200) of two 12.5 inch segments (200*a*) wide and three 16 inch segments (200*a*) in length. Alternatively, the batt (200) is of four segments (200*a*) in length, as in FIG. 2A. Thus each segment (200*a*) is 12.5 inches by 16 inches, according to an embodiment of the invention, as described above.

The width of each segment (200*a*) of at least somewhat greater than 11.5 inches wide, including and not limited to 12 inches wide, can be installed to adapt by compression in a band joist cavity of 10.5 inches wide. To adapt by compression in a band joist cavity of 14.5 inches wide between joists (106) on 16 inch centers, the segments (220*a*) can be manufactured with a length of at least somewhat greater than 14.5 inches each, including, and not limited to, a length of 16 inches each, for compression in band joist cavities of various dimensions defined by joists (106) of different widths, and spaced apart on 12, 16, 19.2 or 24 inch centers.

Similarly, according to FIG. 2B, a 24 inches wide continuous length (200*b*) of insulation, can be partially divided or completely severed by a cut (200*d*) lengthwise to manufacture batts (200) of two segments (200*a*) wide, with each segment (200*a*) being about 12 inches wide. Similarly, a 23.25 inches wide continuous length (200*b*) of insulation, can be partially divided or completely severed lengthwise to manufacture batts (200) of two segments (200*a*) wide, with each segment (200*a*) being at least somewhat greater than 11.5 inches wide. Each of these segments (220*a*) would need to be at least somewhat greater than 14.5 inches long, including and not limited to 15 and 16 inches, for compression in a band joist cavity between joists on 16 inch centers. Thus, a 23.25 inches wide insulation would be divided into two segments (200*a*) wide, with each segment being at least somewhat greater than 11.5 inches by at least somewhat greater than 14.5 inches, including and not limited to 15 and 16 inches, for compression in band joist cavities of various dimensions defined by joists (106) of different widths, and spaced apart on 12, 16, 19.2 or 24 inch centers.

Similarly, a 23 inches wide continuous length (200b) of insulation, can be partially divided or completely severed lengthwise to manufacture batts (200) of two segments (200a) wide, with each segment (200a) being near to 11.5 inches wide, which satisfies a requirement for a segment (200a) of at least somewhat greater than 10.5 inches for compression in a band joist cavity between joists (106) on 12 inch centers. Each of these segments (220a) would need to be at least somewhat greater than 14.5 inches long, including and not limited to 15 and 16 inches, for compression in a band joist cavity between joists on 16 inch centers. Thus, a 23 inches wide insulation would be divided into two segments (200a) wide, with each segment being 11.5 inches by at least somewhat greater than 14.5 inches, including and not limited to 15 and 16 inches, for compression in band joist cavities of various dimensions defined by joists (106) of different widths, and spaced apart on 12, 16, 19.2 or 24 inch centers.

Further, by installing two segments (200a) of at least somewhat greater than 11.5 inches wide, or by installing two segments of about 12 inches wide, they adapt by compression in a band joist cavity having a width of either 17.7 or 22.5 inches between 2× (two by) joists on 19.2 and 24 inch centers, respectively.

The present invention disclosed herein adapts different widths of insulation 11, 15, 15.25, 16, 23, 23.25, 24 or 25 inches to manufacture batts (200) of either four segments (200a) long or three segments (200a) long, as convenient batt lengths.

According an embodiment of the invention, each of the segments (200a) is, at least somewhat greater than 9.5 inches, by, at least somewhat greater than 14.5 inches, for compression in band joist cavities of various dimensions defined by joists (106) of different widths, and spaced apart on 12, 16, 19.2 or 24 inch centers.

According another embodiment of the invention, each of the segments (200a) is, at least somewhat greater than 9.5 inches, including and not limited to, somewhat greater than 9.5 inches, 10 inches, somewhat greater than 10.5 inches, 11 inches, somewhat greater than 11.25 inches, near to 11.5 inches, somewhat greater than 11.5 inches, 12 inches, 12.5 inches and other presently manufactured widths, by, at least somewhat greater than 14.5 inches, for compression in band joist cavities of various dimensions between joists of various widths, and spaced apart on 12, 16, 19.2 or 24 inch centers.

According another embodiment of the invention, each of the segments (200a) is, at least somewhat greater than 9.5 inches, by, at least somewhat greater than 14.5 inches, including but not limited to, somewhat greater than 14.5 inches, 15 inches, 15.25 inches, 16 inches and other presently manufactured widths, for compression in band joist cavities of various dimensions between joists of various widths, and spaced apart on 12, 16, 19.2 or 24 inch centers.

According another embodiment of the invention, each of the segments (200a) is, at least somewhat greater than 9.5 inches, including and not limited to, somewhat greater than 9.5 inches, 10 inches, somewhat greater than 10.5 inches, 11 inches, somewhat greater than 11.25 inches, near to 11.5 inches, somewhat greater than 11.5 inches, 12 inches, 12.5 inches and other presently manufactured widths, by, at least somewhat greater than 14.5 inches, including but not limited to, somewhat greater than 14.5 inches, 15 inches, 15.25 inches, 16 inches and other presently manufactured widths, for compression in band joist cavities of various dimensions defined by joists (106) of different widths, and spaced apart on 12, 16, 19.2 or 24 inch centers.

Further, according to the present invention, insulation (200b) of different widths will result in different sizes of segments (200a), which are adaptable to insulate band joist cavities despite being of such different sizes. Further, according to the present invention, a whole number of the segments (200a) fill a band joist cavity. The advantage is that whole segments (200a) are used without waste, and without having to measure and cut them.

FIG. 2C discloses a kit of parts (202) having two or more batts (200) together in a group. According to an embodiment of the invention, each separate batt (200) in the kit of parts (202) is a desired batt length, for example, 50 inches long having segments (200a) measuring 12.5 inches by 16 inches. Further, each separate batt (200) in the kit of parts (202) is, either one segment (200a) wide as discussed with reference to FIG. 2A or FIG. 2B, or two segments wide, as discussed with reference to FIG. 2B. Further, the kit of parts (202) can comprise one or more lengthy batts (200), each being folded across its length at each multiple of the desired batt length. For example, a lengthy batt (200) that is longer than the four segments (200a) as discussed with reference to FIG. 2A, is folded at each multiple of four segments (200a) long to correspond with a desired batt length. Further, for example, a lengthy batt (200) that is longer than the three segments (200a) as discussed with reference to FIG. 2B, is folded at each multiple of three segments (200a) long to correspond with a desired batt length. Further, the kit of parts (202) having two or more batts (200) can comprise one or more of the separate batts (200) of either three or four segments long, and one or more of the folded lengthy batts (200) as described herein.

The kit of parts (202) having two or more batts (200) together in a group is packaged by having the two or more batts (200) being bound together with strapping (204) including, and not limited to, metal or plastic strap, tape or twine. Alternatively, the kit of parts (202) having two or more batts (200) together in a group is packaged by being in external packaging (206) including, and not limited to; a bag or a sheath wrapper. Further, the kit of parts (202) having two or more batts (200) together in a group, can be compressed together before being packaged. Then, the compressed batts (200) are packaged to retain their compression. The kit of parts (202) having two or more batts (200) together in a group can be packaged by the strapping (204) alone, or by the external packaging (206) alone, or by a combination of strapping (204) and the external packaging (206).

According to a further embodiment of the invention, a process of making and packaging the kit of parts (202), as previously described with reference to FIG. 2C, is performed in combination with process steps of manufacturing the batts (200), as previously described with reference to FIGS. 2A, 2B, 2D and 2E. Thus, a process of manufacturing the batts (200) further includes the process of combining the two or more batts (200) to make the kit of parts (202), and further includes, the process of packaging the kit of parts (202) by combining the two or more batts (200) with the strapping (204) and/or with the external packaging (206). The process of manufacturing the batts (200) further includes the process of manufacturing two or more batts (200) that are separate from one another and grouped together in the kit of parts (202). Alternatively, the process of manufacturing the batts (200) further includes the process of manufacturing a lengthy batt (200) that is partially divided into multiple segments (200a), and folding the lengthy batt (200) at each interval of a desired batt length to form two or more batts (200) for the kit of parts (202).

Figure 1B:
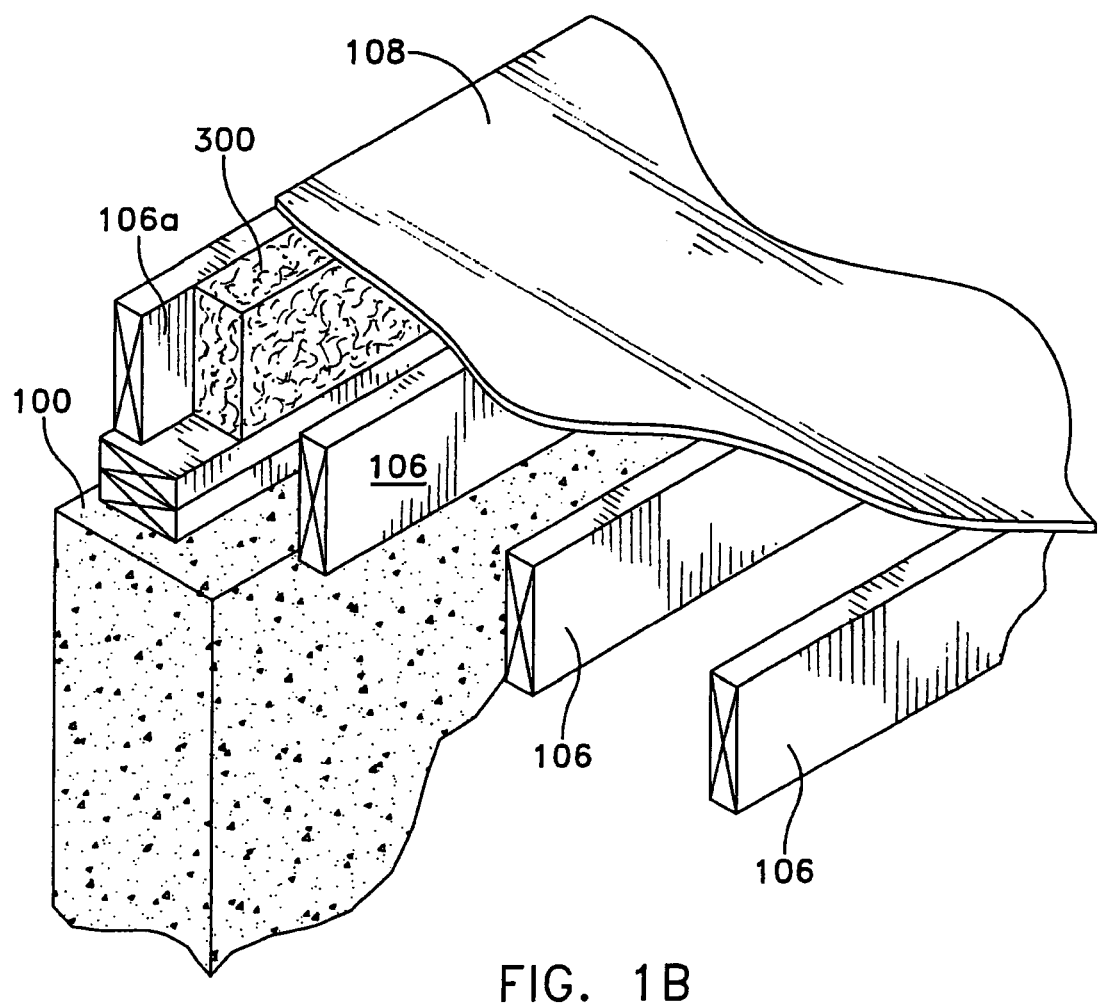
FIG. 1B is a view similar to FIG. 1A disclosing an insulation covered exterior joist.
Figure 3:
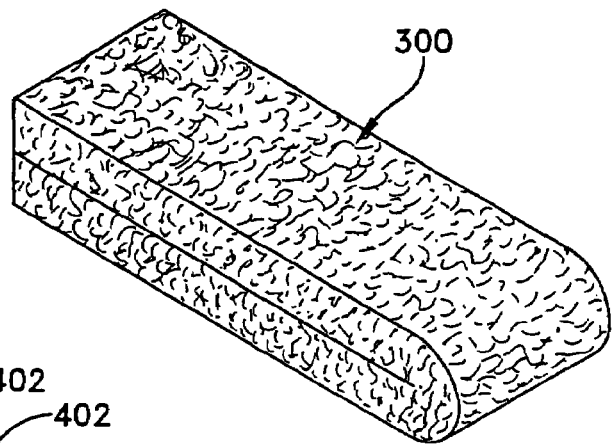
FIG. 3 is an isometric view of a narrow length, folded batt, insulation.

FIG. 3 discloses a long band of insulation (300) for covering a length and width of the exterior joist (106a) disclosed by FIG. 1B. When a horizontal span of the exterior joist (106a) would be greater than a combination of whole number segments (200a), a long band of insulation (300) will be used to fill the span. For example, a long band of insulation (300) is required to cover the length and width of the exterior joist (106a). Because the exterior joist (106a) is 2×10 (1.5 inches by 9.5 inches) or 2×12 (1.5 inches by 11.5 inches), or 2×14 (1.5 inches by 13.5 inches) or 2×16 (1.5 inches by 15.5 inches) a first embodiment of a long band of insulation (300) can measure not less than, and at least somewhat greater than 9.5 inches wide, including and not limited to 10 and 11 inches wide, for compression vertically along a joist width of 9.5 inches. Further the long band of insulation (300) can measure at least somewhat greater than 11.5 inches wide, for example, 12 inches, for compression vertically along a joist width of 11.5 inches and smaller. Further the long band of insulation (300) can measure at least somewhat greater than 13.5 inches wide, for example, 14 inches, for compression vertically along a joist width of 13.5 inches and smaller. Further the long band of insulation (300) can measure at least somewhat greater than 15.5, for example, 16 inches wide, for compression vertically along a joist width of 15.5 inches and smaller. Further, for example, the long band of insulation (300) is supplied in a continuous length of, for example, 8 feet, which can be folded in half, or at each interval of length corresponding approximately to the length of a group of two or more batts (200), for example, of about 50 inches in length.

Figure 4:
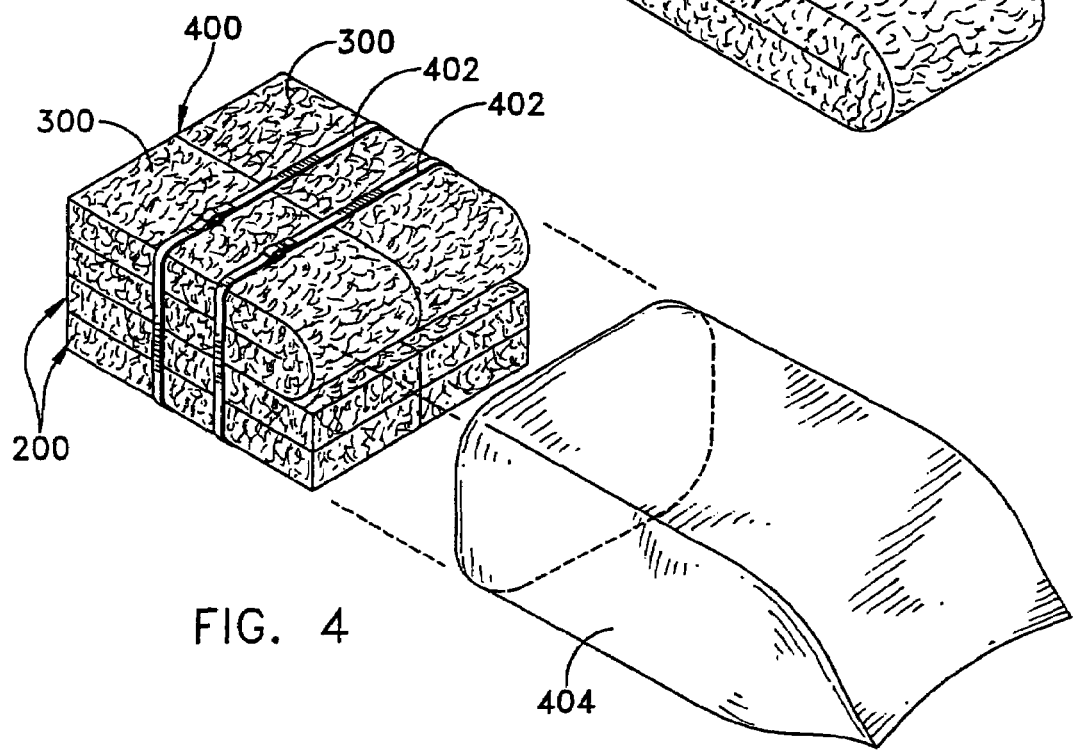
FIG. 4 is an isometric view of another embodiment of a kit of parts.

FIG. 4 discloses a kit of parts (400) according to the invention. The kit of parts (400) has one or more long bands of insulation (300) combined with one or more batts (200). Each batt (200) for the kit of parts (400) comprises any of the batts (200) discussed with reference to the kit of parts (200). Each long band of insulation (300) insulates along an exterior joist (106a) that supports a floor (108) or subfloor. Each batt (200) is partially divided into segments (200a) for insulating between joists (106). Each long band of insulation (300) is folded to have a folded length approximately the same lengths as the batts (200). Each of the long bands of insulation (300) and the batts (200) of a kit of parts (400), are in a group, and are packaged by being bound together with strapping (402) of metal strap, tape or twine, and/or by being in a bag or sheath wrapper (404), similarly as the kit of parts (202) discussed previously with reference to FIG. 2C.

Figure 5:
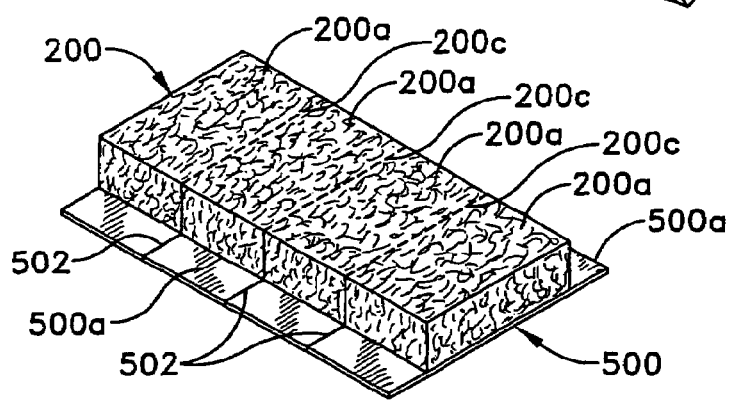
FIG. 5 is an isometric view of a segmented batt having a segmented vapor retarder.

FIG. 5 discloses a batt (200) having four segments (200a), as discussed previously with reference to FIG. 2A, and further having the segments (200a) and an attached vapor barrier or vapor retarder (500). For example, the vapor retarder (500) comprises a facing that includes, and is not limited to; kraft paper, foil scrim kraft paper, polymeric (PP, polypropylene, PE, polyethylene, PS, polystyrene) film, foil, metal foil, laminates thereof, and combinations thereof. Bituminous asphalt is used primarily to adhere kraft paper. Water based adhesives and hot melt are used primarily to adhere foils and films.

The vapor retarder (500) is assembled to the continuous length (200b) of insulation, followed by cutting the vapor retarder (500) with perforations (502) simultaneously with cutting of the segments (200a) by the slicing rules (212) or perfing rules (212). Alternatively, the perforations (502) of the vapor retarder (500) are cut separately from the insulation segments (200a), followed by assembly of a cut vapor retarder (500) and the segments (200a) of the batts (200). The vapor retarder (500) covers one major surface of the segments (200a). The vapor retarder (500) is segmented with perforations (502) at the same intervals as the segments (200a) being covered by the vapor retarder (500). Further, the vapor retarder (500) has extended side margins (500a) that are perforated, and that project beyond opposite sides of the segments (200a) for stapling to adjacent joists (106). Similarly, each of the batts (200) as discussed with reference to FIG. 2A and FIG. 2B is provided with a vapor retarder (500). Alternatively, each of the batts (200) as discussed with reference to FIG. 2A and FIG. 2B is without a vapor retarder (500).

The vapor retarder (500) can be manually torn along its perforations (502) to separate adjacent segments (200a) from one another. When a wide band joist cavity is large enough to be filled with two or more segments (200a) covered by the vapor retarder (500), then, the vapor retarder (500) would have exposed perforations (502) that are exposed after being installed in a band joist cavity. A seal, including and not limited to, adhesive or tape, can be installed to cover the exposed perforations (502). Alternatively, a removable adhesive or tape can be applied immediately after manufacture of the perforations (502).

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A kit of parts comprising:
   multiple batts of insulation capable of compaction for insulating areas between spaced apart framing members of a building, at least one of said batts being a segmented batt partially divided by being partially severed to provide at least three segments of said insulation connected to one another;
   each said segment having a desired R-value thickness, and further having an area size capable of compaction to a compacted area size of 9.5 inches by 10.5 inches to cover a corresponding area between spaced apart framing members, wherein the corresponding area comprises a cavity width between framing members of about 10.5 inches, about 12.5 inches, about 14.5 inches, about 17.7 inches or about 22.5 inches, and wherein the corresponding area comprises a cavity height provided by the framing members of about 9.5 inches, about 11.5 inches, about 13.5 inches or about 15.5 inches, and wherein said corresponding area has said cavity width and said cavity height measuring such that the compacted area size of one of said segments is oriented to cover said corresponding area, or said corresponding area has said cavity width and said cavity height measuring such that the compacted area sizes of a whole number of said segments are oriented and are placed beside one another to cover said corresponding area; and
   one or more lengths of insulation folded across its length in the kit of parts for insulating along a length and width of an exterior joist.

2. The kit of parts of claim 1, wherein;
   said segments are uncovered by a vapor barrier.

3. The kit of parts of claim 1, wherein;
   said at least one of said batts has a width in the range of one segment wide to two segments wide.

4. The kit of parts of claim 1 wherein;
   each said segment has either a width or length sized to adapt by compaction between joists spaced apart on about 12 inch centers, on about 14 inch centers or on about 16 inch centers, and having widths of about 9.5 inches or about 11.5 inches, and two or more of said segments adapt by compaction between other joists spaced apart on about 19.2 inch centers or on about 24 inch centers.

5. The kit of parts of claim 1, wherein;
said at least one of said batts has a width of one segment.

6. The kit of parts of claim 1, wherein;
said at least one of said batts has a width of two segments beside each other.

7. The kit of parts of claim 1, wherein;
four of said segments define a length of said at least one of said batts.

8. The kit of parts of claim 1, wherein; each of the lengths of insulation has a folded length approximately the same length as the batts.

9. The kit of parts of claim 1, wherein each segment is about 12.5 inches long, and said at least one batt is about 11 inches wide and four segments long.

10. The kit of parts of claim 1, wherein each segment is at least about 16 inches long, and said at least one batt is about 11 inches wide and three segments long.

11. The kit of parts of claim 1, wherein each segment is about 12.5 inches long, and said at least one batt is at least about 16 inches wide and four segments long.

12. The kit of parts of claim 1, wherein each segment is at least about 16 inches long, and said at least one batt is at least about 12.5 inches wide and three segments long.

13. The kit of parts of claim 1, wherein each segment is at least about 16 inches long, and said at least one batt is about 25 inches wide and partially divided into two rows of segments, wherein each of the segments is about 12.5 inches wide.

14. The kit of parts of claim 1, wherein said at least one batt is about 23 inches wide, about 23.25 inches wide, about 24 inches wide or about 25 inches wide, and each segment is at least about 16 inches long.

15. The kit of parts of claim 14, wherein said at least one batt is partially divided into two rows of segments.

16. The kit of parts of claim 1, wherein said at least one batt is about 23 inches wide, about 23.25 inches wide, about 24 inches wide or about 25 inches wide, and each segment is at least about 12.5 inches long.

* * * * *